United States Patent
Paintz et al.

(10) Patent No.: US 7,944,159 B2
(45) Date of Patent: May 17, 2011

(54) ROTOR ORIENTATION DETECTION IN BRUSHLESS DC MOTORS

(75) Inventors: Christian Paintz, Ypres (BE); Thomas Freitag, Ypres (BE); Detlef Klose, Ypres (BE)

(73) Assignee: Melexis NV, Ypres (BE)

( * ) Notice: Subject to any disclaimer, the term of this patent is extended or adjusted under 35 U.S.C. 154(b) by 440 days.

(21) Appl. No.: 12/148,350

(22) Filed: Apr. 18, 2008

(65) Prior Publication Data

US 2009/0108783 A1    Apr. 30, 2009

(30) Foreign Application Priority Data

Apr. 20, 2007 (GB) .................................... 0707672.2

(51) Int. Cl.
*H02P 6/00* (2006.01)
(52) U.S. Cl. ............... 318/400.01; 318/400.14; 318/721
(58) Field of Classification Search ............. 318/400.01, 318/400.11, 400.13, 400.14, 400.27, 400.32, 318/400.36, 560, 721, 799, 280, 700; 388/800, 388/813
See application file for complete search history.

(56) References Cited

U.S. PATENT DOCUMENTS

| | | | | |
|---|---|---|---|---|
| 4,544,868 A * | 10/1985 | Murty | ....................... | 318/400.11 |
| 5,028,852 A * | 7/1991 | Dunfield | ................... | 318/400.33 |
| 5,036,264 A * | 7/1991 | Ueki | ......................... | 318/400.13 |
| 5,191,270 A * | 3/1993 | McCormack | ............. | 318/400.11 |
| 5,821,713 A * | 10/1998 | Holling et al. | ............ | 318/400.32 |
| 6,100,656 A * | 8/2000 | El-Sadi et al. | ............ | 318/400.11 |
| 6,150,778 A * | 11/2000 | Morris | ........................ | 318/254.1 |
| 6,229,274 B1 * | 5/2001 | Vertemara et al. | ............. | 318/430 |
| 6,650,082 B1 * | 11/2003 | Du | ................................. | 318/701 |
| 7,034,499 B2 * | 4/2006 | Kerlin et al. | ................... | 318/749 |

* cited by examiner

*Primary Examiner* — Walter Benson
*Assistant Examiner* — Antony M Paul
(74) *Attorney, Agent, or Firm* — Kilpatrick Townsend & Stockton LLP

(57) ABSTRACT

In order to determine the orientation of the rotor of a brushless DC motor 100, a sequence of current pulses may be applied to the stator phases U, V, W by the respective drivers HS0, LS0, HS1, LS1, HS2, LS2. The current generated in the stator phases U, V, W in turn generates a current in a shunt resistor 110. The current in this shunt resistor 110 is monitored by use of a current voltage converter 120 and a comparator 130 to determine when it exceeds a predetermined threshold. The rise time until the threshold current is exceeded is recorded in capture unit 140. A processor unit 150 then calculates a scalar parameter SU, SV, SW for each respective stator phase U, V, W from the recorded rise times associated with each pulse. The orientation of the magnetic axis of the rotor can then be determined by consideration of the scalar parameters SU, SV, SW of each stator phase U, V, W, as the respective rise times of each pulse are determined by the inductive properties of the respective stator phases U, V, W, which in turn are dependent upon the orientation of the rotor.

13 Claims, 3 Drawing Sheets

ROTOR ORIENTATION DETECTION IN BRUSHLESS DC MOTORS

CROSS-REFERENCES TO RELATED APPLICATIONS

This application claims priority to United Kingdom Application No. 0707672.2, filed Apr. 20, 2007, the disclosure of which is herein incorporated by reference.

BACKGROUND OF THE INVENTION

The present invention relates to the determination of rotor orientation in brushless DC motors and in particular to the determination of rotor orientation when the rotor is stationary or rotating relatively slowly.

In order to drive a brushless DC motor, it is necessary to detect the orientation of the magnetic axis of the permanently magnetic rotor such that the appropriate driving current may be fed to each stator phase. A stator phase is built up from one or more coils, depending on motor geometry. This can be achieved by the provision of dedicated sensor means, such as a Hall effect sensor. Alternatively, it is possible to determine the rotor orientation without an additional dedicated sensor.

This can be achieved by monitoring the phase inductance which is affected by the rotor orientation.

Monitoring an induced back EMF is not possible when the rotor is stationary e.g. at start up and may also be difficult shortly after start up when the rotor speed is low. In such cases, it is known to determine the rotor orientation by applying pulses to pairs of stator phases simultaneously and determining the sign of the difference in voltage between the stator phases or the sign of the difference in time required to rise to a threshold voltage between stator phases to determine the rotor orientation. Such methods are only ever applied to the resultant inductance along a path consisting of at least a pair of stator phases at any one time. Measuring in this manner using a minimum of two stator phases at every step increases the possibilities for error due to a smaller saturation effect and greater noise. This is a particular problem when the rotor is positioned close to alignment with one of the stator phases because in this case only one phase is being saturated by the rotor flux and the other phases within the conducting path of the applied pulse contribute little to the measured saturation effect. Therefore the measured total inductance variation of the entire path consisting of at least two phases in series is smaller and hence more susceptible to noise.

SUMMARY OF THE INVENTION

It is therefore an object of the present invention to provide a method of determining the position of a rotor in a brushless DC motor that alleviates or overcomes the above problems.

According to a first aspect of the present invention there is provided a method of determining the position of a rotor in a brushless DC motor comprising the steps of: applying a sequence of current pulses to the stator phases, such that each stator phase experiences an equal number of current pulses in a first direction; measuring for each pulse the rise time for the stator phase current to exceed a predetermined threshold level; summing the measured rise times for which each stator phase has experienced a current pulse in a first direction to generate respective scalar parameters for each stator phase, the respective scalar parameters being indicative of the inductance of each stator phase; and thereby determining the orientation of the rotor by consideration of the relative values of the scalar parameters of each stator phase.

This thus provides a method by which a more accurate determination of rotor orientation can be made as each stator phase inductance is calculated only on the basis of its own inductive properties. Furthermore, the present method is operable using a smaller current pulse than prior art methods. This is possible because the signal to noise ratio is increased by way of superposition of measurements. Because of the smaller currents, the rise and especially decay times in between measurements are also shorter and hence the method takes less time than the prior known methods.

In one embodiment, the first direction is the same relative direction for each stator phase. The first direction may be either a current flow from the phase pin of the stator phase to the star point of the motor (positive direction) or may be a current flow from the star point of the motor to the phase pin of the stator phase (negative direction). In a preferred embodiment, each stator phase experiences, say, three pulses in the first direction.

In another embodiment, the sequence of current pulses is applied to the stator phases, such that each stator phase experiences an equal number of current pulses in a first direction and an equal number of current pulses in a second opposite direction. In such embodiments, the scalar parameter for each stator phase is preferably generated by calculating the difference between the sum of rise times for current pulses generating current flows in the first direction in the respective stator phase and the sum of rise times for current pulses generating current flows in the second direction in the respective stator phase. The first direction may be a current flow from the phase pin of the stator phase to the star point of the motor (positive direction) and the second direction may be a current flow from the star point of the motor to the phase pin of the stator phase (negative direction) or vice versa. Applying pulses in different directions can compensate for asymmetries in the stator phases.

In such embodiments, preferably each stator phase experiences three pulses wherein the current flows in the first direction and three pulses wherein the current flows in the second direction. For a three stator phase motor, this may be achieved by a sequence of six pulses.

Consideration of the scalar parameters to determine rotor orientation may comprise ranking the scalar parameters in size order. In such circumstances, the rotor's magnetic axis lies closest to alignment with the stator phase with the largest absolute value of scalar parameter.

The consideration may comprise the further step of calculating the ratios of the median value scalar parameter to the smallest value and to the largest value of the scalar parameters to determine how close to or far from alignment the rotor orientation is with the axis of the stator phase between the largest and smallest scalar parameters. This provides additional resolution as to the actual orientation of the rotor. The method is totally independent from the number of pole pairs of the permanent magnet and the number of coils representing each motor phase. It can therefore be applied to systems with less than three phases or more than three phases, as appropriate.

The rise time of the current in each pulse may be monitored using a shunt resistor. A comparator may be provided to determine when the current flowing in the shunt resistor exceeds the predetermined threshold value. Preferably an interval is left between pulses to allow residual current in the stator phases to decay away. The interval between pulses may be of a preset duration or may be dependent upon the rise time of the previous pulse. The threshold current value may be chosen such that the rise times (and associated delay times) are relatively short enabling the pulse sequence to be completed rapidly. Additionally, a low threshold value minimizes the likelihood that the rotor will move as a result of the pulse.

According to a second aspect of the present invention there is provided a brushless DC motor operable to detect rotor orientation in accordance with the method of the first aspect of the present invention.

The brushless DC motor may incorporate any or all of the features described in relation to the method of the first aspect of the invention as desired or as appropriate. In order that the invention can be more clearly understood it is now described further below with reference to the accompanying drawings:

DESCRIPTION OF THE PREFERRED EMBODIMENTS

Figure 1:
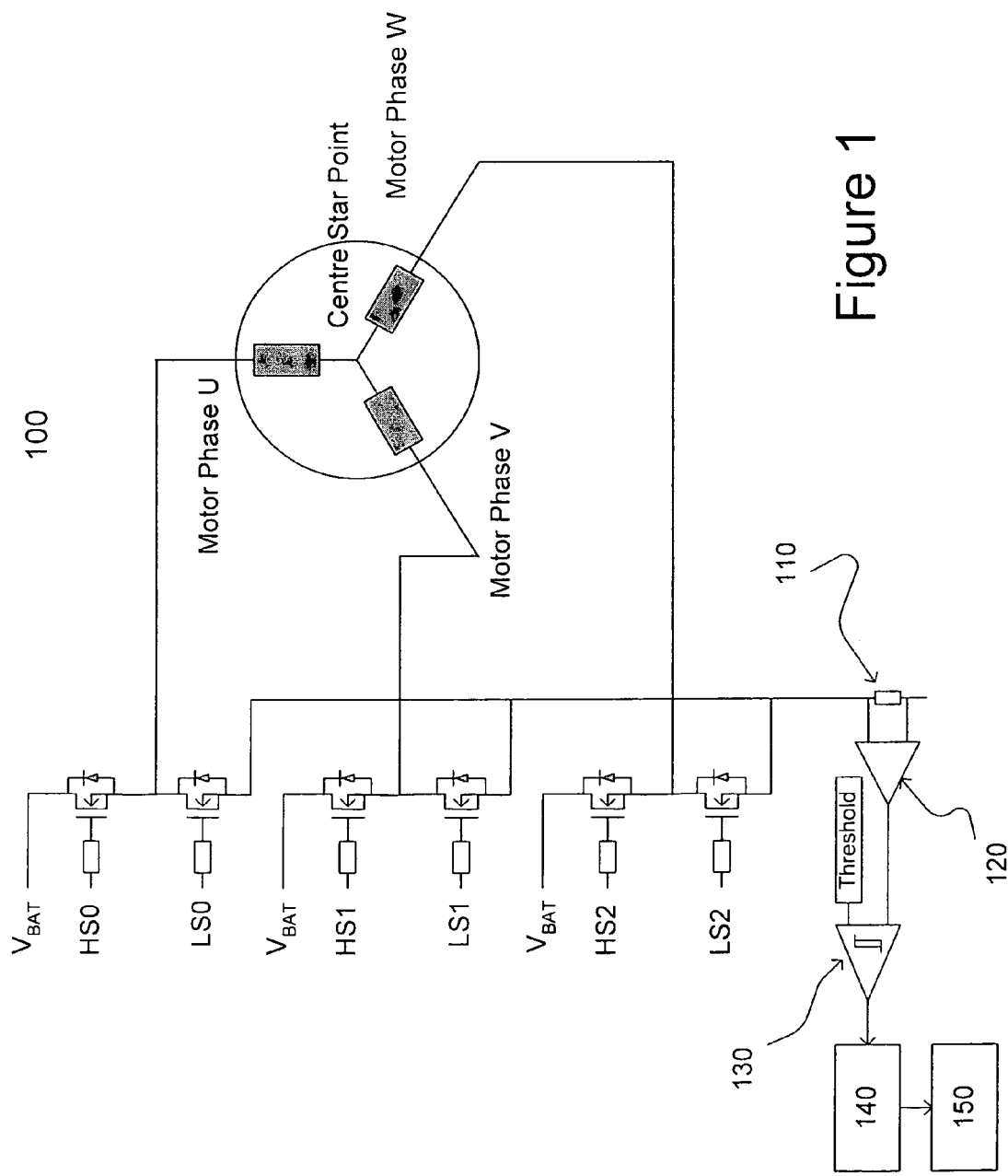
FIG. 1 is a schematic block diagram of a brushless DC motor.

Referring now to FIG. 1, a brushless DC motor 100 comprises three stator phases U, V and W. The stator phases U, V and W are connected together at a central star point and are connected separately to driving electronics at a phase pin: stator phase U being driven via drivers HS0 and LS0; stator phase V being driven via drivers HS1 and LS1; and stator phase W being driven via drivers HS2 and LS2. In the present example, when the respective HS drivers are activated, a current flows in the respective stator phase in the direction from the star point to the phase pin (defined as a negative direction for the purposes of the present description). Conversely, when the respective LS drivers are activated, a current flows in the respective stator phase in the direction from the phase pin to the star point (defined as a positive direction for the purposes of the present description).

In order to determine the orientation of the rotor, a sequence of current pulses may be applied to the stator phases U, V, W by the respective drivers HS0, LS0, HS1, LS1, HS2, LS2. The current generated in the stator phases U, V, W in turn generates a current in a shunt resistor 110. The current in this shunt resistor 110 is monitored by use of a current voltage converter 120 and a comparator 130 to determine when it exceeds a predetermined threshold. The rise time until the threshold current is exceeded is recorded in capture unit 140. A processor unit 150 then calculates a scalar parameter SU, SV, SW for each respective stator phase U, V, W. The scalar parameter of each stator phase is indicative of the inductance of each respective stator phase U, V, W.

The scalar parameters SU, SV, SW are calculated from the recorded rise times associated with each pulse. The orientation of the magnetic axis of the rotor can then be determined by consideration of the scalar parameters SU, SV, SW of each stator phase U, V, W, as the respective rise times of each pulse are determined by the inductive properties of the respective stator phases U, V, W, which in turn are dependent upon the orientation of the rotor.

In the particular example described herein the applied current pulse sequence is set out in Table 1.

TABLE 1

| Pulse Number | LS0 | HS0 | LS1 | HS1 | LS2 | HS2 | Capture Time |
|---|---|---|---|---|---|---|---|
| 1 | 0 | 1 | 0 | 1 | 1 | 0 | T1 |
| 2 | 1 | 0 | 1 | 0 | 0 | 1 | T2 |
| 3 | 1 | 0 | 0 | 1 | 1 | 0 | T3 |
| 4 | 0 | 1 | 1 | 0 | 0 | 1 | T4 |
| 5 | 1 | 0 | 0 | 1 | 0 | 1 | T5 |
| 6 | 0 | 1 | 1 | 0 | 1 | 0 | T6 |

As can be seen, the pulse sequence comprises six separate pulses and results in each stator phase U, V, W experiencing three current pulses in the positive direction and three current pulses in the negative direction.

Taking the first pulse as an example, drivers HS0, HS1 and LS2 are activated. This results in a negative direction flow in stator phases U and V and a positive direction current flow in stator phase W. Similarly, in the second pulse, drivers LS0, LS1 and HS2 are activated. This results in a positive direction flow in stator phases U and V and a negative direction current flow in stator phase W, and so on.

Once the pulse sequence is complete, the scalar parameter for each respective stator phase U, V, W is calculated. The scalar parameter for each respective stator phase is calculated by calculating the difference between the sum of rise times for current pulses generating current flows in the first direction in the respective stator phase and the sum of rise times for current pulses generating current flows in the second direction in the respective stator phase. Taking stator phase U as an example, the sum of the rise time for positive current flows (SUP) is given by:

$$SUP=T2+T3+T5; \text{ and}$$

the sum of the rise time for negative current flows (SUN) is given by:

$$SUN=T1+T4+T6; \text{ thus}$$

the scalar parameter for stator phase U (SU) is given by:

$$SU=SUP-SUN$$

Similarly, for the other two stator phases V, W:

$$SVP=T2+T4+T6; \text{ and } SWP=T1+T3+T6; \text{ and}$$

$$SVN=T1+T3+T5; \text{ thus } SWN=T2+T4+T5; \text{ thus}$$

$$SV=SVP-SVN \quad SW=SWP-SWN$$

In order to determine the position of the rotor, the scalar parameters SU, SV and SW are ranked in ascending order of absolute value. The magnetic axis of the rotor can be determined to lie closest to alignment with the axis between the stator phase with the largest scalar parameter value and the stator phase with the smallest scalar parameter value. Using the ranking to find maximum and minimum scalar values for position estimation can indicate the orientation of the rotor within a 60 electrical degrees sector. The sign of the median scalar parameter can then be used to indicate the orientation of the rotor within a 30 electrical degrees sector. Alternatively, the resolution can be further increased by considering the ratio of the median value scalar parameter to the smallest value scalar parameter and to the largest scalar parameter. In the event that the median and smallest values are very similar, the rotor can be determined to be more closely aligned with the axis of the stator phase with the largest value of scalar parameter than if the median and smallest values differ widely.

Figures 2A, 2B, 2C:
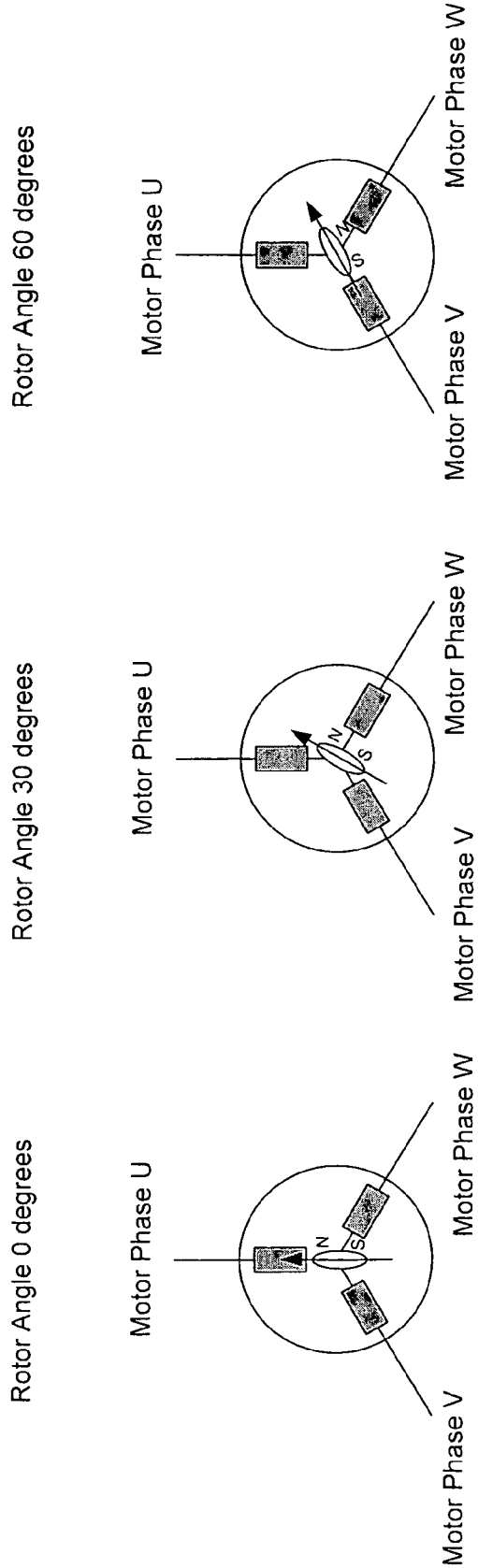
FIGS. 2a-c are a series of schematic diagrams illustrating different possible rotor orientations.
Figure 3:
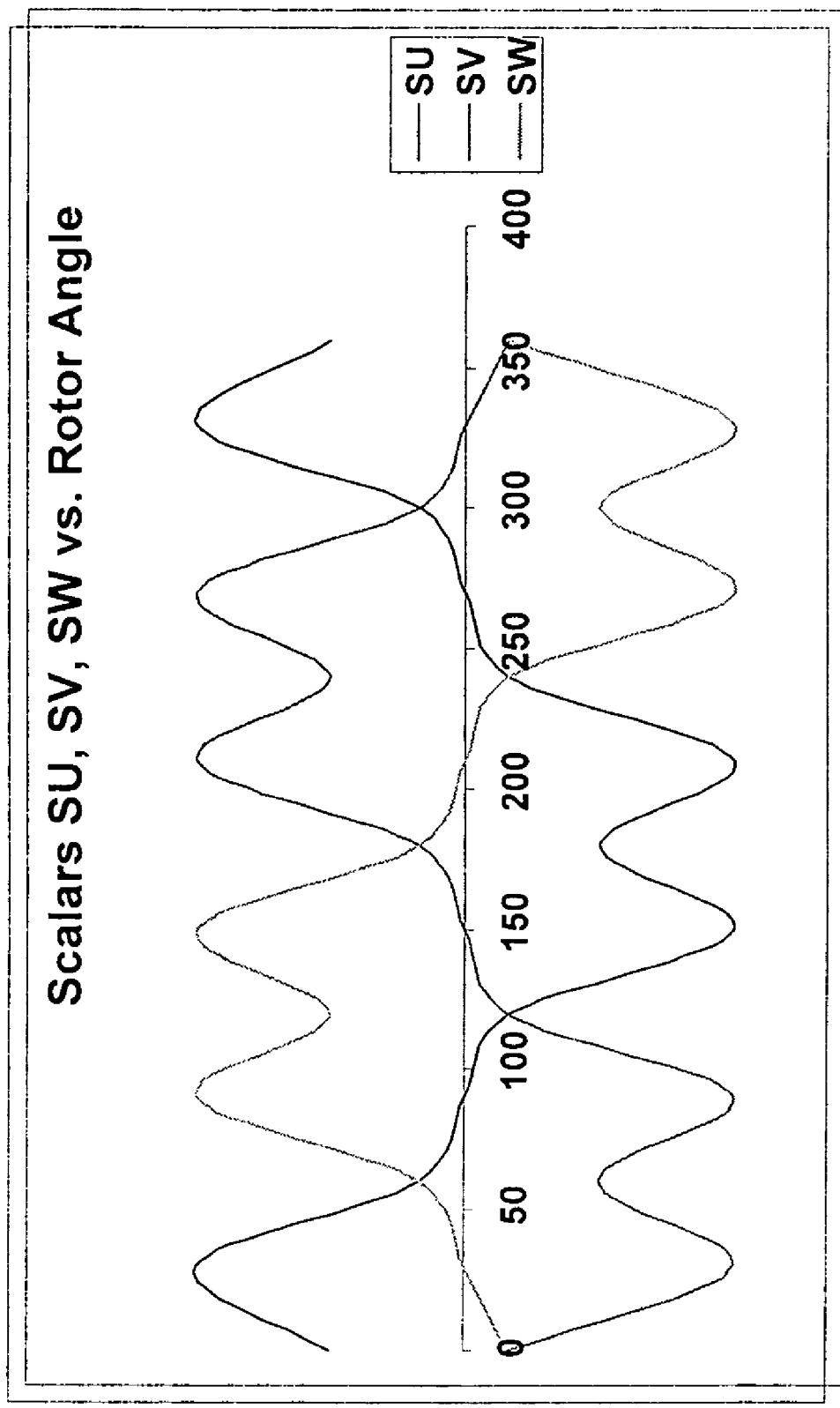
FIG. 3 is a graph indicating the variation of the scalar parameter for each stator phase as the rotor orientation varies.

This is illustrated more clearly by the following description with reference to FIGS. 2a-2c, which shows the rotor of motor 100 oriented at three different angles with respect to the phases, in combination with FIG. 3 and Table 2, which illustrate graphically and numerically the variation in scalar parameters SU, SV and SW with rotor orientation.

TABLE 2

| Rotor Orientation (°) | SU | SV | SW |
|---|---|---|---|
| 0 | 60 | −20 | −20 |
| 30 | 120 | −120 | 0 |
| 60 | 20 | −60 | 20 |
| 90 | 0 | −120 | 120 |
| 120 | −20 | −20 | 60 |
| 150 | −120 | 0 | 120 |
| 180 | −60 | 20 | 20 |
| 210 | −120 | 120 | 0 |
| 240 | −20 | 60 | −20 |
| 270 | 0 | 120 | −120 |
| 300 | 20 | 20 | −60 |
| 330 | 120 | 0 | −120 |
| 360 | 60 | −20 | −20 |

At a rotor orientation of 0° (FIG. 2a), the rotor axis is in line with the axis of stator phase U and equally misaligned with stator phases V and W. Accordingly, the largest scalar parameter is SU, which is also positive, while scalar parameters SV and SW are equal and negative.

At a rotor orientation of 30° (FIG. 2b), the rotor axis is closest in alignment between stator phases U and V. Accordingly, the values of SU and SV are equal but of opposite sign and both larger in absolute terms than the value of SW.

At a rotor orientation of 60° (FIG. 2c), the rotor axis is in opposition with the axis of stator phase V and equally misaligned with stator phases U and W. Accordingly, the largest scalar parameter is SV, which is also negative, while scalar parameters SV and SW are equal and positive.

While the above method has been described in terms of calculating the scalar parameters for each stator phase based upon current pulses applied in both directions, it is possible, if the stator phases and the drivers are sufficiently symmetric, for the scalar parameters to be calculated from current pulses applied in a single direction only. This would result in a faster calculation of rotor orientation as fewer pulses would be required and fewer steps would subsequently be needed to calculate the respective scalar parameters.

It is of course to be understood that the invention is not to be restricted to the details of the above embodiments, which have been described by way of example only.

The invention claimed is:

1. A method of determining the position of a rotor in a brushless DC motor comprising the steps of: applying a sequence of current pulses to the stator phases, such that each stator phase experiences an equal number of current pulses in a first direction; measuring for each pulse the rise time for the stator phase current to exceed a predetermined threshold level; summing the measured rise times for which each stator phase has experienced a current pulse in a first direction to generate respective scalar parameters for each stator phase, the respective scalar parameters being indicative of the inductance of each stator phase; and thereby determining the orientation of the rotor by ranking the scalar parameters in size order and calculating the ratios of the median value scalar parameter to the smallest value and to the largest value of the scalar parameters to determine how close to or far from alignment the rotor orientation is with the axis of the stator phase between the largest and smallest scalar parameters.

2. A method as claimed in claim 1 wherein the first direction is the same relative direction for each stator phase and may be either a current flow from the phase pin of the stator phase to the star point of the motor (positive direction) or may be a current flow from the star point of the motor to the phase pin of the stator phase (negative direction).

3. A method as claimed in claim 1 wherein each stator phase experiences three pulses in the first direction.

4. A method as claimed in claim 1 wherein the sequence of current pulses is applied to the stator phases, such that each stator phase experiences an equal number of current pulses in a first direction and an equal number of current pulses in a second opposite direction.

5. A method as claimed in claim 4 wherein the scalar parameter for each stator phase is generated by calculating the difference between the sum of rise times for current pulses generating current flows in the first direction in the respective stator phase and the sum of rise times for current pulses generating current flows in the second direction in the respective stator phase.

6. A method as claimed in claim 4 wherein the first direction may be a current flow from the phase pin of the stator phase to the star point of the motor (positive direction) and the second direction may be a current flow from the star point of the motor to the phase pin of the stator phase (negative direction) or vice versa.

7. A method as claimed in claim 4 wherein each stator phase experiences three pulses wherein the current flows in the first direction and three pulses wherein the current flows in the second direction.

8. A method as claimed in claim 1 wherein the rise time of the current in each pulse is monitored using a shunt resistor.

9. A method as claimed in claim 8 wherein a comparator is provided to determine when the current flowing in the shunt resistor exceeds the predetermined threshold value.

10. A method as claimed in claim 1 wherein an interval is left between pulses to allow residual current in the stator phases to decay away.

11. A method as claimed in claim 10 wherein the interval between pulses is of a preset duration or is dependent upon the rise time of the previous pulse.

12. A method as claimed in claim 1 wherein the threshold current value is chosen such that the rise times (and associated delay times) are relatively short enabling the pulse sequence to be completed rapidly.

13. A brushless DC motor operable to detect rotor orientation in accordance with the method of claim 1.

* * * * *